(12) United States Patent
Depro et al.

(10) Patent No.: US 7,908,606 B2
(45) Date of Patent: Mar. 15, 2011

(54) USAGE METERING SYSTEM (75) Inventors: Kenneth J. Depro, Spring City, PA (US); Chad E. Frederick, Schwenksville, PA (US); Nicholas M. Luzeski, Jr., Paoli, PA (US)

(73) Assignee: Unisys Corporation, Blue Bell, PA (US)

( * ) Notice: Subject to any disclaimer, the term of this patent is extended or adjusted under 35 U.S.C. 154(b) by 1361 days.

(21) Appl. No.: 11/134,183

(22) Filed: May 20, 2005

(65) Prior Publication Data

US 2006/0265713 A1 Nov. 23, 2006

(51) Int. Cl.
G06F 9/46 (2006.01)
G06F 17/00 (2006.01)
G06Q 20/00 (2006.01)
G01R 11/56 (2006.01)
G01R 21/133 (2006.01)

(52) U.S. Cl. ............ 718/104; 718/105; 700/90; 705/63; 705/412

(58) Field of Classification Search ........... 718/104–105
See application file for complete search history.

(56) References Cited

U.S. PATENT DOCUMENTS

| | | | | |
|---|---|---|---|---|
| 3,702,006 A * | 10/1972 | Page | | 718/105 |
| 4,943,912 A * | 7/1990 | Aoyama et al. | | 712/16 |
| 5,475,844 A | 12/1995 | Shiramizu et al. | | |
| 5,644,768 A * | 7/1997 | Periwal et al. | | 718/102 |
| 5,838,968 A * | 11/1998 | Culbert | | 718/104 |
| 5,862,333 A * | 1/1999 | Graf | | 709/223 |
| 6,125,394 A * | 9/2000 | Rabinovich | | 709/226 |
| 6,266,745 B1 * | 7/2001 | de Backer et al. | | 711/147 |
| 6,282,560 B1 * | 8/2001 | Eilert et al. | | 718/100 |
| 6,320,585 B1 * | 11/2001 | Engel et al. | | 345/440 |
| 6,341,303 B1 * | 1/2002 | Rhee et al. | | 718/104 |
| 6,351,794 B1 * | 2/2002 | Spilo et al. | | 711/173 |
| 6,430,618 B1 * | 8/2002 | Karger et al. | | 709/225 |
| 6,438,704 B1 * | 8/2002 | Harris et al. | | 713/502 |
| 6,457,008 B1 * | 9/2002 | Rhee et al. | | 707/10 |
| 6,578,068 B1 * | 6/2003 | Bowman-Amuah | | 709/203 |
| 6,647,448 B1 * | 11/2003 | Brelin | | 710/107 |
| 6,654,780 B1 * | 11/2003 | Eilert et al. | | 718/104 |
| 6,728,737 B2 * | 4/2004 | Wollrath et al. | | 707/206 |
| 6,950,848 B1 * | 9/2005 | Yousefi'zadeh | | 709/203 |
| 7,020,878 B1 * | 3/2006 | Rhee et al. | | 718/104 |
| 7,028,301 B2 * | 4/2006 | Ding et al. | | 718/104 |
| 7,047,337 B2 * | 5/2006 | Armstrong et al. | | 710/200 |
| 7,096,248 B2 * | 8/2006 | Masters et al. | | 709/201 |
| 7,146,353 B2 * | 12/2006 | Garg et al. | | 707/2 |
| 7,155,722 B1 * | 12/2006 | Hilla et al. | | 718/105 |
| 7,174,379 B2 * | 2/2007 | Agarwal et al. | | 709/226 |
| 7,237,016 B1 * | 6/2007 | Schober | | 709/223 |
| 7,240,346 B2 * | 7/2007 | Demsey et al. | | 718/1 |
| 7,243,145 B1 * | 7/2007 | Poortman | | 709/223 |
| 7,266,821 B2 * | 9/2007 | Polizzi et al. | | 718/100 |

(Continued)

Primary Examiner — Emerson C Puente
Assistant Examiner — Adam Lee
(74) Attorney, Agent, or Firm — Richard J. Gregson (57) ABSTRACT

A usage metering system for determining computer resource utilization is described herein. Computer resource utilization is determined by accumulating instances of computer resource utilization based on array of counters. This enables an accurate determination of instances of when a predetermined threshold baseline of computer resource utilization is exceeded over an accumulated period of time. By using an array of counters to collect data rather than averaging values over time, a more accurate indication of computer resource utilization is determined. The usage metering system has little impact on computer system resources, because snapshots can be taken on a fairly infrequent basis, and any computer resource utilization calculations can be performed on computer platforms separated from the system being monitored.

16 Claims, 6 Drawing Sheets

U.S. PATENT DOCUMENTS

| | | | |
|---|---|---|---|
| 7,296,268 B2 * | 11/2007 | Darling et al. | 718/105 |
| 7,380,039 B2 * | 5/2008 | Miloushev et al. | 710/244 |
| 7,395,537 B1 * | 7/2008 | Brown et al. | 718/104 |
| 7,437,728 B2 * | 10/2008 | Stackhouse et al. | 718/104 |
| 7,464,165 B2 * | 12/2008 | Vo et al. | 709/226 |
| 7,487,237 B2 * | 2/2009 | Lloyd et al. | 709/224 |
| 7,523,286 B2 * | 4/2009 | Ramany et al. | 711/170 |
| 2002/0116441 A1 * | 8/2002 | Ding et al. | 709/105 |
| 2004/0117790 A1 * | 6/2004 | Rhine | 718/100 |
| 2004/0139433 A1 * | 7/2004 | Blythe et al. | 718/100 |
| 2004/0255295 A1 * | 12/2004 | Stackhouse et al. | 718/100 |
| 2005/0138168 A1 * | 6/2005 | Hoffman et al. | 709/224 |
| 2005/0149940 A1 * | 7/2005 | Calinescu et al. | 718/104 |
| 2005/0210470 A1 * | 9/2005 | Chung et al. | 718/100 |
| 2006/0005083 A1 * | 1/2006 | Genden et al. | 714/47 |
| 2006/0136927 A1 * | 6/2006 | Covell et al. | 718/105 |
| 2006/0143617 A1 * | 6/2006 | Knauerhase et al. | 718/104 |
| 2006/0190944 A1 * | 8/2006 | Moon et al. | 718/104 |
| 2007/0094665 A1 * | 4/2007 | Jackson | 718/104 |
| 2007/0174840 A1 * | 7/2007 | Sharma et al. | 718/104 |
| 2008/0052718 A1 * | 2/2008 | Hundscheidt | 718/104 |

* cited by examiner

USAGE METERING SYSTEM

TECHNICAL FIELD

The present invention relates generally to monitoring utilization of computer resources in a computer system, and more specifically, to usage metering technology.

BACKGROUND

A new model for purchasing a computer system has emerged in the computer industry, referred to as capacity-on-demand billing. According to this model, the customer agrees to purchase a computer system with a fixed baseline performance capability level based on a quantity of computer resources installed on the computer system (i.e., the number of Central Processing Units (CPUs), memory units, and/or Input/Output (I/O) modules, available in the computer system). In return, the manufacturer of the computer system agrees to install extra computer resources on the computer system at no upfront expense to the customer, and the customer is entitled to use the extra computer resources, but on a pay-per-use basis. Automated usage metering technology employed with the computer system detects when the customer's resource usage exceeds a threshold level, i.e., the fixed baseline performance capability level, and the customer is charged a usage fee for excessive usage over the threshold. Typically, the usage metering technology operates in the background recording computer resource utilization data and transmitting the data to a billing site for invoicing.

An advantage of the capacity-on-demand billing model is that it allows the customer to purchase a computer system with reserve capacity, but at no additional upfront costs. This means a customer may have additional resources instantly available during periods of high computing demand, but without the penalty of having to purchase extra computer resources that lay dormant during slower demand periods.

Ensuring the customer is accurately charged for using computer resources above an agreed threshold is a challenge with the capacity-on-demand billing model. For instance, some usage metering technologies rely on averaging methods that tend to record the resource utilization of a computer system over relatively long periods and often fail to account for the moment-by-moment operation of a typical computer system performing real-world tasks. For example, suppose a customer purchased a computer system with an agreed to maximum threshold of four CPUs, but in actuality, resident with the computer system are 16 CPUs. Now suppose that for three hours out of the day the customer uses 12 CPUs worth of processing power and for the remaining 21 hours the customer uses only two CPUs worth of processing power. If the usage metering technology uses an averaging method, it would appear that the customer only used 3.2 CPUs worth of CPU resources, which is well within the customer's baseline threshold of four CPUs. In reality, for three hours out of the day during peak usage, 12 CPUs were used and the customer should have been charged for using eight additional CPUs over their four base CPUs. In other words, but for the ability to use the additional CPU resources during peak usage times, the customer's work would not have been completed in a timely fashion, and the customer ought to have been charged for using extra resources, but was not in this scenario. Thus, a drawback with sampling usage data on an averaging basis is the likelihood that the metering usage tool may fail to capture short-lived events, and may produce results with a lower computer resource utilization level than actually occurring in a computer system.

To compensate for averaging problems, some usage metering tools attempt to collect system resource data metrics, such as CPU and I/O performance data, at high frequencies to accurately reflect system resource utilization. A drawback, however, of sampling performance data at high frequencies is a tendency to consume a substantial amount of system resources, which skews computer resource consumption measurements, is expensive, and burdensome.

SUMMARY

A usage metering system for determining computer resource utilization is described herein. The usage metering system collects iterative snapshots of computer resource utilization. Each snapshot provides a value indicative of the amount of specific computer resource utilized during a particular duration of time. Each value of a snapshot is used to select a particular counter from an array of counters corresponding to the value of the snapshot. The particular counter is incremented and the process repeats itself for a next snapshot. After a particular duration of time, the values of each counter are collected from the array of counters, and a usage report can be generated showing actual computer resource utilization accumulated over the particular duration of time, and more particularly, the number of instances computer resource utilization exceeded a threshold level of computer resource utilization over the particular duration of time. Based the usage report it is possible to bill for usage that exceeded the threshold levels, and the quantity and extent of usage that exceed the threshold levels.

In an exemplary implementation, the usage metering system uses a collection module to collect the snapshots from the computer system and increment the counters. To reduce impacting computer resource utilization, the collector module may pass resource utilization data to a reporter module that resides on a separate system (although both the collector module and reporter module may reside on the same system in an alternative implementation). The reporter module receives the utilization data from the collector module, consolidates and formats the data for billing purposes and/or other purposes, such as health monitoring and assessment. The reporter module may also monitor the health of a collector module and send an alert if problems are detected with the collector module. Redundant collector modules and reporter modules may also be used to protect against a loss of utilization data or failures that may preclude monitoring of computer resource utilization.

The usage metering system, therefore, introduces the broad concept of determining computer resource utilization by accumulating instances of computer resource utilization based on an array of counters. This enables an accurate determination of instances of when a predetermined threshold baseline of computer resource utilization is exceeded over an accumulated period of time. By using an array to collect data rather than averaging values overtime, a more accurate indication of computer resource utilization is determined. The usage metering system has little impact on computer system resources, because the snapshot process is very lightweight, and any computer resource utilization calculations can be performed on computer platforms separated from the system being monitored.

Various other features and advantages shall become more apparent from the following description.

BRIEF DESCRIPTION OF THE DRAWINGS

The detailed description is explained with reference to the accompanying figures. In the figures, the left-most digit(s) of a reference number identifies the figure in which the reference number first appears.

DETAILED DESCRIPTION

Computing Environment

Figure 1:
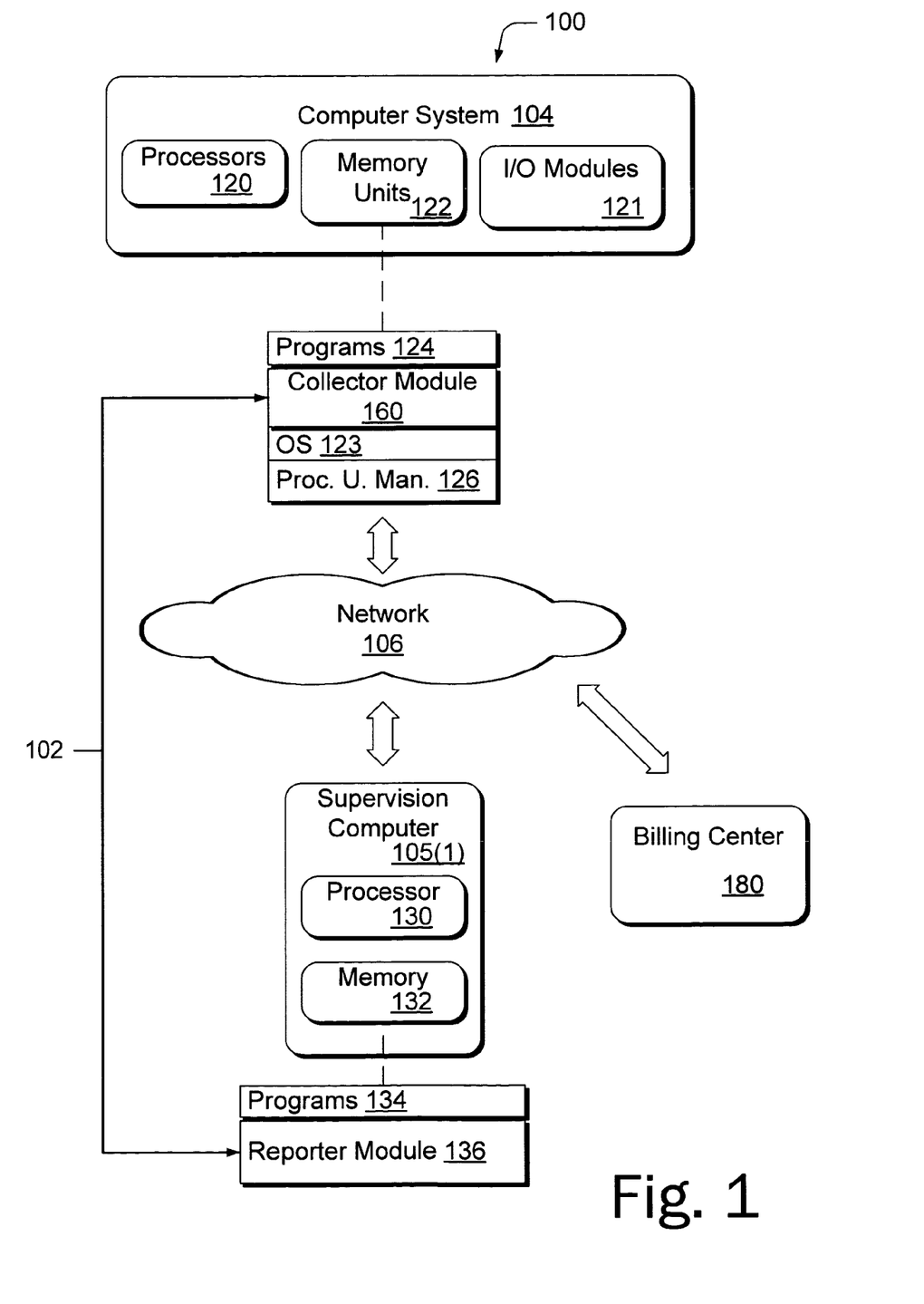
FIG. 1 illustrates an exemplary computing environment within which an innovative usage metering system and methodologies can be either fully or partially implemented.

FIG. 1 illustrates an exemplary computing environment 100 within which an innovative usage metering system 102 and methodologies can be either fully or partially implemented. The innovative systems and methods described herein are operational with numerous other general purpose or special purpose computing system environments or configurations. The exemplary computing environment is only one example of a suitable computing environment and is not intended to suggest any limitation as to the scope of use or functionality of systems and methods described herein. Additionally, the exemplary computing environment should not be interpreted as having any dependency or requirement relating to any one or combination of components illustrated in the computing environment.

According to one exemplary implementation, computing environment 100 includes a computer system 104, a supervision computer 105, and a network 106.

Computer system 104 can be any of a variety of computer devices, including workstations, multiprocessor systems, mainframe computers, enterprise systems, and a combination of any of the above example devices. Each computer system 104 includes computer resources such as processors 120, memory units 122, and I/O modules 121.

For example, each processor or group of processors comprise a CPU, which is typically responsible for controlling the interpretation and execution of computer-executable instructions (program instructions) in the form of software or logic, performs arithmetic and logical operations on data, and controls I/O functions.

Memory units 122 represent any part of a computer system where data and instructions are stored, such as main memory, central memory, immediate access memory, cache, registers, discs, and related storage devices. Memory units 122 may include volatile memory (e.g., RAM) and/or non-volatile memory (e.g., ROM, PCMCIA cards, etc.).

I/O modules 121 provide communication interfaces with other devices such as networks, printers, disks, computers, terminals, and other various devices able to connect to and communicate with a computer system.

Resident in the memory units 122 is one or more operating systems 123, and software applications 124 that execute on the one or more processors 120. For purposes of illustration, programs and other executable program modules are illustrated herein as discrete blocks, although it is recognized that such programs and components reside at various times in different storage components of the computer systems 104, and are executed by the one or more processors 120. Example of software applications 124 include, but are not limited to, application programs, email programs, word processing programs, spreadsheets programs, Internet browser programs, Web services and so forth.

In one implementation, operating system 123 is produced by Microsoft Corporation of Redmond, Wash., USA, such a Microsoft® Window® related operating system, which commonly implements high-level application-program interfaces (APIs), file systems, communications protocols, input/output data conversions, and other functions to enable software applications 124 to operate. Although the exemplary implementations will generally be described in the context of Microsoft operating systems, it is possible that other operating systems, such as Linux, UNIX, OS/400, AIX, and others, could be used in accordance with the principles and illustrations described herein.

Operating system 123 generally maintains a process utilization manager 126, such as the Windows NT Performance Monitoring API, present in the Windows operating system environment, and most commonly known through its well-known client programs as the Windows Task Manager, System Monitor, or Performance Monitor (Perfmon). Process utilization manager 126 generally maintains raw data, such as processes, sub-process, components, and threads (hereinafter processes) consuming computer resources associated with computer system 104. The process utilization manager 126 maintains utilization data indicating CPU, memory, and I/O utilization in computer system 104.

Other elements such as power supplies, keyboards, touch pads, I/O interfaces, displays, LEDs, audio generators, and so forth are not shown as being a part of computer systems 104, but could easily be a part of the computer systems 104. Additionally, although not shown, a system bus or point-to-point connections typically connects the various components within computer systems 104.

Network 106 represents any of a variety of networks and may include the Internet, or one or more other networks (e.g., a local area network (LAN) or wide area network (WAN). Additionally, it may also be possible for various devices to communicate directly with other devices without using network 106 as a communication link in the form of a point-to-point connection.

Supervision computer 105 is a computer system capable of communicating with computer system 104. Supervision computer 105 may refer to, but is not limited to, a personal computer, a workstation, a server, a mainframe computer, an enterprise server, and potentially other devices that communicate with and provide services to end users and/or other computer devices. Although only one supervision computer 105 is shown in FIG. 1, it is readily appreciated that environment 100 may include more than one supervision computer 105.

Supervision computer 105 also includes at least one processor 130 and memory 132. Resident in memory 132 are one or more operating systems (not shown), and programs 134 that execute on the one or more processor 130. Other elements such as power supplies, keyboards, touch pads, I/O interfaces, displays, LEDs, and so forth are not shown in supervision computer 105, but could easily be a part of the exemplary supervision computer 105. Additionally, although not shown, a system bus or point-to-point connections typically connects the various components within supervision computer 105.

Having introduced an exemplary environment 100 in which usage metering system 102 functions, it is now possible to describe usage metering system 102 in detail.

Exemplary Usage Metering System

Usage metering system 102 is a software-based tool that collects computer resource utilization data from process utilization manager 126 and reports the amount of computer resources used on the computer system 104 to a monitoring facility, such as a billing center 180. Computer resource utilization data may include CPU utilization, memory utilization, I/O metrics, and potentially other process utilization metrics and units of execution.

Usage metering system 102 is composed of two primary software components: a collector module 160 and a reporter module 136. The collector module 160 is responsible for low level collection of utilization data from process utilization manager 126. The reporter module 136 is responsible for receiving utilization data transferred from the collector module 160 via network 106 or other communication path. The reporter module 136 is also responsible for formatting and forwarding the utilization data to a collection point, such as billing center 180, customer service center (not shown), Information Technology department (not shown), and so forth. The reporter module 136 may also monitor the status of one or more collectors operating on a computer system 104, such as for monitoring the health of computer system 104 and for reporting anomalies with computer system 104.

In one implementation, collector module 160 and reporter module 136, operate on computer systems 104 and supervision computer 105, respectively, and communicate programmatically with each other as well as other program processes. Alternatively, collector module 160 and reporter module 136 could reside on the same platform. Typically, collector module 160 and reporter module 136 communicate with each other using at least one of a variety of communication protocols. For example, on one implementation, collector module 160 uses Transmission Control Protocol/Internet Protocol (TCP/IP) sockets to communicate with reporter module 136.

Collector module 160 operates as a system level process. Although only one collector module 160 is shown in FIG. 1, it is appreciated that more than collector module 160 may be employed. For instance, if computer system 104 has logical partitions such that sets of resources can be operated independently with its own operating system instance than a collector module can be targeted to collect utilization data from each particular OS instance. Each collector module, such as collector module 160, typically samples computer resource utilization data directly from the OS performance counters (not shown), which are part of the process utilization manager 126.

Collector module 160 is designed to be extremely lightweight so that its impact on overall system utilization is negligible. Collector module 160 measures peak instances of computer resource utilization observed on an iterative basis, and records the measurements in an array (to be described). Each element of the array represents a count of how many times a corresponding computer utilization value was observed. At user defined intervals, collector module 160 transmits the utilization data (the counts comprising the array of counters) to the reporter module 136 for consolidation and report generation. Accordingly, only minimal work is performed by collector module 160, and the more process intense analysis and consolidation of data is offloaded and performed on the supervision computer 105 by reporter module 136 minimizing any impact on computer resource utilization levels measured on computer system 104.

The reporter module 136 may also execute as system level process on supervision computer 105, although it is possible for reporter module 136 to execute on computer system 104. When the reporter module 136 receives the utilization data from one or more collector modules, the data is consolidated and formatted as a report for transmission to a user designated location. For instance, in one implementation, the data is transmitted to a recipient center in the form of an electronic message (e-mail); however, other forms of transfer may be used. The report may indicate how many times a computer resource was utilized and the extent to which the utilization exceeded a particular threshold. For example, information maintained by the array of counters can easily be consolidated over a defined period of time, such as a week, month or a quarter, and a report can be generated at prescribed times summarizing computer resource utilization over a period of time. The report may be used for purposes of generating a bill, in the event it is determined that the customer utilized more computer resources than the customer's agreed threshold performance capability level. Reporter module 136 may maintain an archive of data in a memory 132 to guard against loss of data at collection site.

The reporter module 136 may also monitor the health of computer system 104 by reporting if any particular collector module 160 fails to communicate with reporter module 136, or fails to communicate in a prescribed fashion, which may indicate that a OS instance or computer system 104 is experiencing a malfunction. If a prescribed period elapses and reporter module 136 fails to receive utilization data from collector module 160 or communicate in a acceptable manner with a collector module, reporter module 136 can send an alert message (such as an e-mail) to a user designated location to report the potential anomaly.

Although FIG. 1 shows a single system topology for discussion purposes, those skilled in the art should appreciate that usage metering system 102 may be deployed in various forms. For example, in one implementation several collector modules and reporter modules may be deployed as part of usage metering system 102. A collector module and a reporter module may be deployed for each system partition requiring monitoring. Each collector and reporter module pair acts as an independent unit and may not communicate with other collector and reporter modules that may be deployed on the same network.

In another implementation, a collector module is installed on each system/partition to be monitored. A reporter module is installed to service the collector modules. The reporter module may reside on a system/partition with a collector or it may be installed on a stand-alone system such as supervision computer 105. In such an implementation, collector modules and the reporter module are usually located on the same Local Area Network (LAN) segment.

In still another implementation, one collector module is installed on each system/partition to be monitored. Two or more reporter modules are installed to service the collector modules. Again, the reporter modules may reside on the same system/partitions as the collector modules or be installed on a standalone system. Using redundant reporter modules ensures that if one reporter module fails (or its platform fails), another reporter module can take over the task of collecting utilization data from collector modules and reporting the data.

Collector module 160 and reporter module 136 of FIG. 1 shall now be described in more detail as follows.

Exemplary Collector Module

Figure 2:
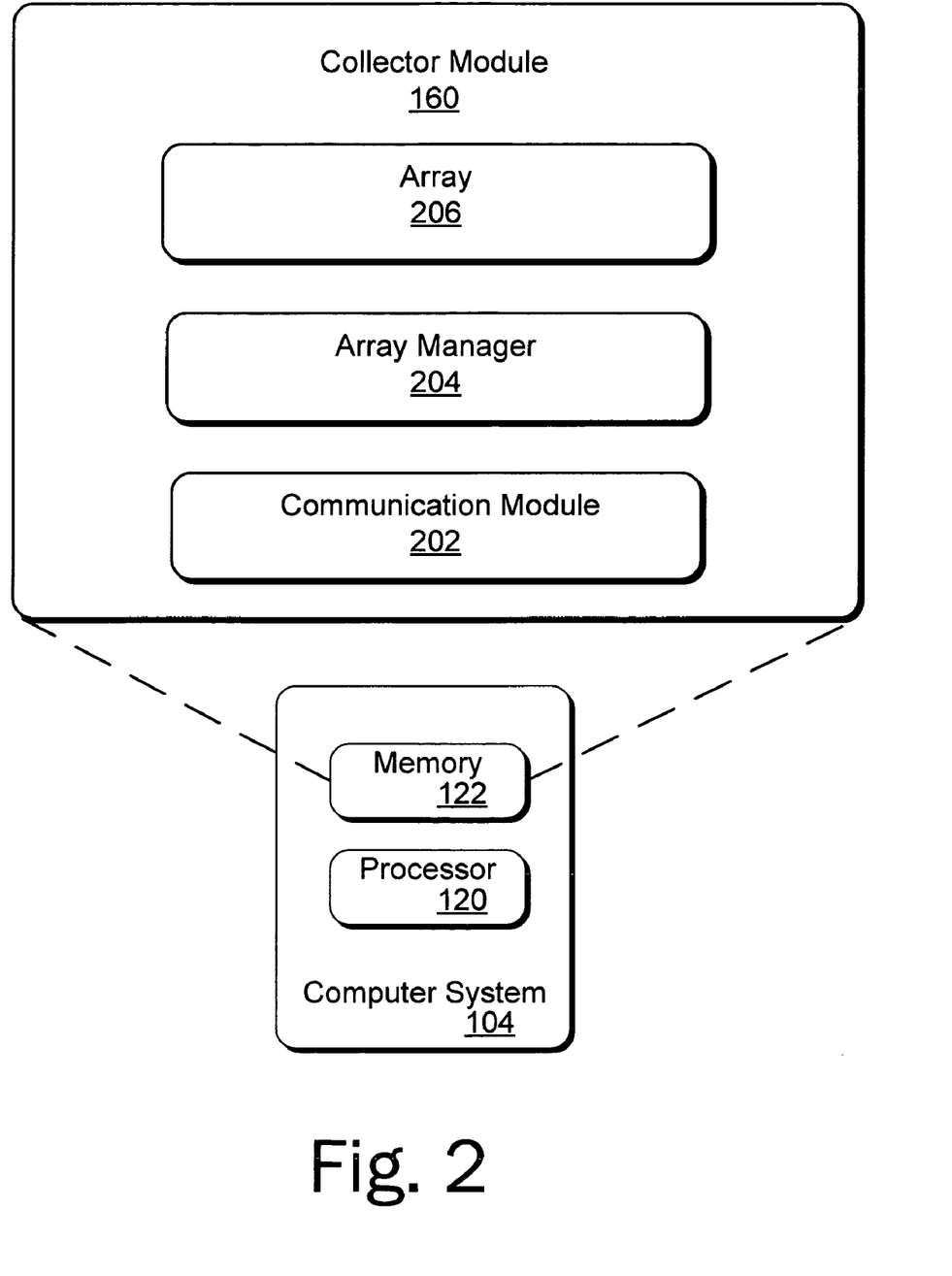
FIG. 2 is a block diagram of an exemplary collector module.

FIG. 2 is a block diagram of a collector module 160 residing in memory 122 (FIG. 1) of a computer system 104 (FIG. 1). Collector module 160 typically operates as a background module and may operate in a secure mode, to prevent being tampered with by users of computer system 104. The collector module 160 is usually automatically activated when computer system 104 is functioning. In one implementation, collector module 160 comprises a communications module 202, an array manager 204, and an array 206. Although it is appreciated that collector module may comprise program modules and data. Program modules typically include routines, programs, objects, threads, components, and so on, for performing particular tasks or implementing particular abstract data types.

Communication module 202 communicates with reporter module 136 (FIG. 1). For example, communication module 202 transmits performance data for storage and manipulation by reporter module 136. Communications module 202 may also record other descriptive data, such as the date/time of the snapshots as well as identification indicia, indicating the particular computer system (or partition) on which the information was recorded. The identification indicia enable the reporter module 136 when it receives data from different collector modules to associate the particular data with a particular system or partition. Communications module 202 can also receive rules/instructions from reporter module 136 (FIG. 1), such as when to take snapshots, how often to transmit data to supervision computer 105 (FIG. 1), where to send data including whether to send data to redundant reporter modules, etc. In the exemplary implementation, communication module 202 communicates with reporter module 136 (FIG. 1) using TCP/IP protocols over network 106 (FIG. 1), but other communication protocols could be used such as RPC, COM+, DCOM, and Multicast.

Array manager 204 collects performance data from process utilization manager 126 on an iterative basis. That is, array manager 204 samples (i.e., takes a "snapshot" of) process utilization manager 126 on a continuous basis over prescribed period of time and stores the utilization data in an array 206 for eventual transmission to reporter module 136 (FIG. 1) via communication module 202. Array manager 204 uses the communication module 202 to transmit utilization data.

Array manager 204 uses a timer (not shown) to manage the overall period of time (minutes, hours, days, weeks, months) continuous snapshots are taken. Array manager 204 also uses a timer to control the amount of time between two consecutive readings are taken from the process utilization manager 126 (FIG. 1) i.e., the delay intervals between snapshots. In one implementation, array manager 204 takes a reading (also referred to as a snapshot) of the process utilization manager 126 (FIG. 1) every five seconds. However, the amount of time between snapshots is configurable. Preferably the time interval selected between snapshots should be frequent enough to capture real-time computer utilization events but not too frequent so as to impact computer utilization measurements on a particular computer system 104 (FIG. 1).

Each snapshot provides a value indicative of a peak amount of a computer resource utilized at a particular time interval. Each value of a snapshot is used by array manager 204 to select a particular element (also referred to as a "bucket") from an array 206 corresponding to the value of the snapshot. Each element corresponding to the value of the snapshot contains a count indicating the number of times the particular computer resource level (value) was observed. So each time a particular value is observed, a corresponding bucket with the same value is selected and the count associated with that bucket is incremented by one.

For example, suppose array manager 204 reads a CPU resource utilization value of 10% for each of its first two readings from process utilization manager 126 (FIG. 1). In this case, array manager 204 selects the $10^{th}$ bucket of an array and increments the counter associated with the $10^{th}$ bucket twice, so the value contained in the $10^{th}$ bucket would equal two.

Figure 3:
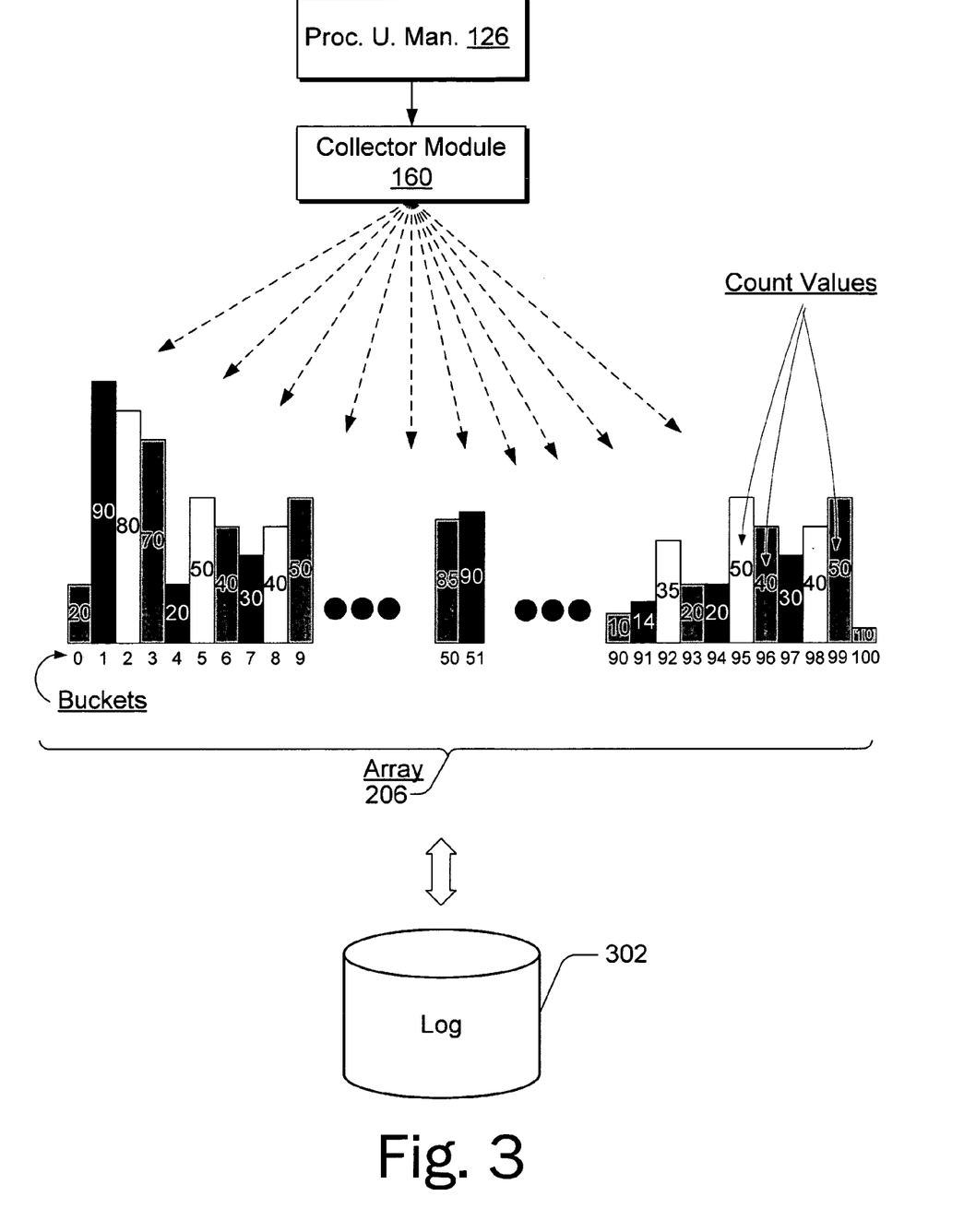
FIG. 3 shows an exemplary array in which utilization data is maintained.

FIG. 3 shows an exemplary array 206. Array 206 includes 101 buckets labeled at the bottom of each bucket, 0 through 100. The number of each bucket corresponds to a metric value (i.e., a particular computer resource level value). For example, suppose a CPU value of 90% is read from process utilization manager 126 by array manager 204 (FIG. 2), then that value of 90% would correspond to bucket 90. In each bucket is a counter value indicating the number of times the particular computer resource level value was observed over a particular duration of time. For example, in bucket 90 there is a count value 10, which indicates that there ten instances over a particular duration of time a computer resource was 90% utilized. If during another instance of time a snapshot is taken of the process utilization manager 126, which indicates that a computer resource was again 90% utilized, then the count value contained in bucket 90 is incremented by one and the count value would read 11 (not shown) instead of 10 (shown). Thus, each bucket contains a count value which indicates the number of times a particular computer resource utilization percentage was reached over a particular duration of time. For example, bucket 1 of array 206 shows that there were 90 instances over a particular duration of time that a particular computer resource was utilized at a peak utilization level of 1%; and so forth.

As shown in FIG. 3, the array 206 may be stored in memory 122 (FIG. 1) as part of a log 302 or file.

Referring back to FIG. 2 again, after a configurable duration of time (e.g., seconds, minutes, hours or even days), utilization data from array 206 (i.e., count values from buckets 0 through 100) are transmitted to reporter module 136 (FIG. 1) via communication module 202 (FIG. 2) and network 106 (FIG. 1). Once there is a confirmation from reporter module 136 that the data was successfully received, array module 204 resets all the counters in array 206 and the process repeats itself for the next duration of time.

Exemplary Reporter Module

A portion of usage metering system 102 may also reside in memory in the form of an innovative reporter module 136, such as in memory 132 of supervision computer 105. Reporter module 136 is a program module that communicates with collection module 160 and uploads information forwarded by (or pulled by) collection module 160 to determine workload utilization of computer resources executing on computer system 104. That is, reporter module 136 is configured to collect utilization data (counter values from the array and other potential information) from collection module 160 and consolidate and format the data to construct a billing record which can be transmitted to a billing center 180 if the billing center 180 resides separately from supervision computer 105. Reporter module 136 may also be responsible for monitoring the status of one or more collection modules 160 and send an alert message if abnormalities are observed. As such the health of computer system 104 may be monitored.

Figure 4:
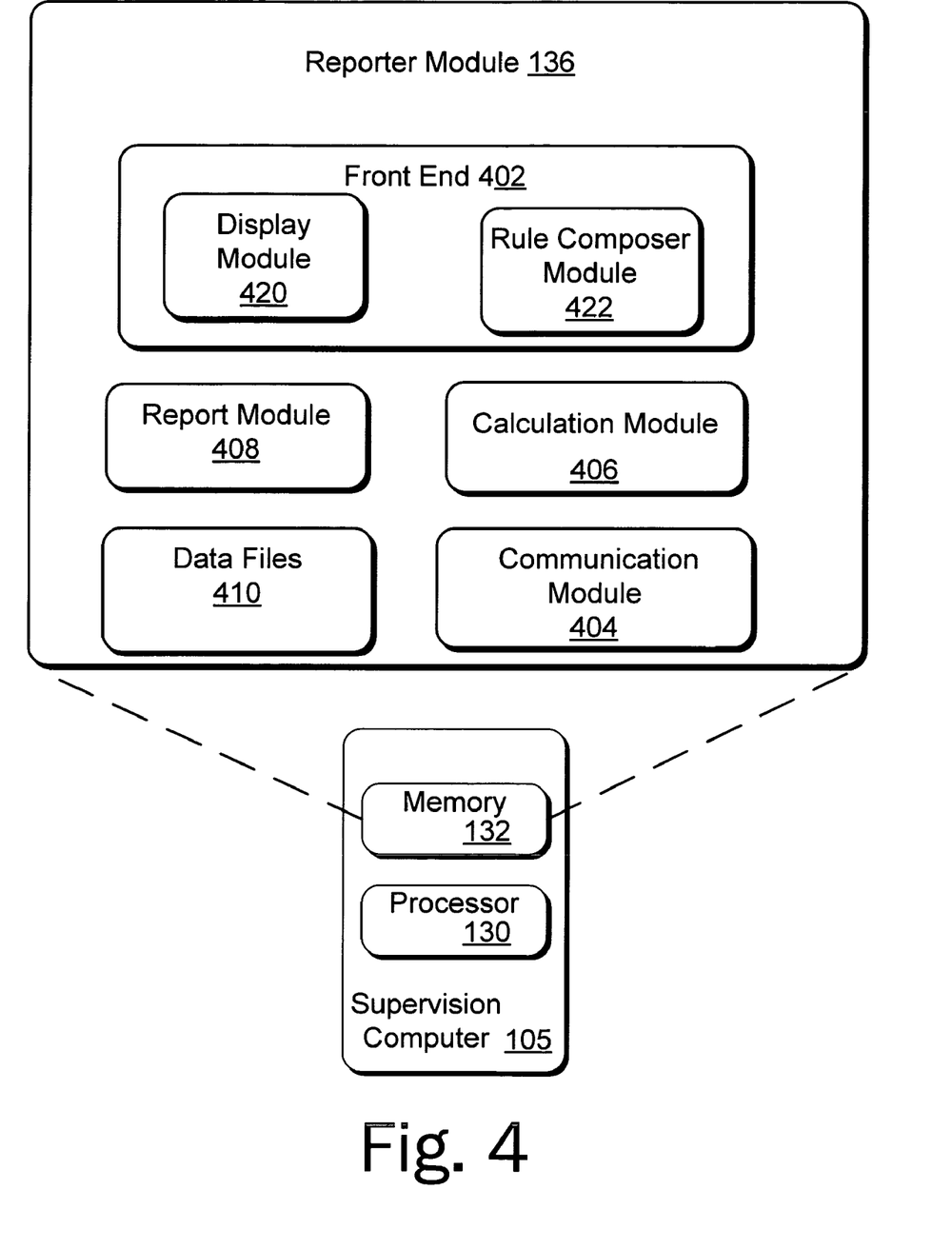
FIG. 4 is a block diagram of an exemplary reporter module.

FIG. 4 is a block diagram of a reporter module 136 residing in memory 132 of supervision computer 105. In this example, reporter module 136 comprises program modules and program data. Program modules typically include routines, programs, objects, threads, components, and so on, for performing particular tasks or implementing particular abstract data types. The processor 130 is configured to fetch and execute computer program instructions from the program modules in memory 132, and is further configured to fetch data from program data while executing the reporter module 136.

In the exemplary implementation, reporter module 136 comprises a front end 402, a communication module 404, a calculation module 406, a report module 408, and data files 410.

Front end 402 is a module that allows a user to connect (i.e., login) into the supervision computer 105 (directly or over a network 106) and access a user interface (not shown). Using the user interface, the user can control the characteristics of the usage metering system and monitor computer resource utilization on computer systems 104. For example, network accessible front end 402 comprises a display module 420 and a rule composer module 422.

Display module 420 view information about collector modules 160 (FIG. 1), including how often data is forwarded from each collector module 160 (FIG. 1), which instance or system is being monitored, etc. Display module 220 also enables the user, to view precise information detailing computer resource utilization in computer systems 104.

Rule composer module 422 enables a user to: install reporter modules on supervision systems 105, install collector modules on computer system 104, configure and deploy rules that instruct how information is sent from collector modules (such as how often), configure and deploy rules of how and when to generate reports indicating a quantity of computer system resources utilized over select period of time (such as month, week, quarter, etc.). This information may be further utilized by billing software or other applications for billing a department responsible for the software application that operates on the computer systems 104.

Communications module 404 connects the supervision computer 105 to the computer systems 104 over network 106 (FIG. 1) to transmit and receive various data required by collection agents 160 (FIG. 1) and reporter module 136. The communication module 404 accepts transmission of data files, including logs containing arrays from collector module 160 for storage on the supervision computer 105 in data files 410.

The communication module 404 also facilitates transmission of instructions and rules for collecting utilization data and information from computer systems 104. This enables the computer systems 104 (via collector modules 160) to store the instructions, data, and rules as indicated by reporter module 136.

Communications module 404 also transmits information to collector modules 160 to ensure that each module (if more than one) is collecting utilization data at precise intervals and forwarding the data from arrays 206 at prescribed periods of time.

Reporter module 136 through communications module 404 also may participate in health monitoring of computer system 104 (FIG. 1). This is accomplished by pinging each collector module 160 (FIG. 1) to monitor the status of the collector module, i.e., make sure it is still functioning. Malfunctions with collector modules, or a loss of communication with computer system 104 ensures that reporter module 136 will send an alert message to a center, such as service center, bill center, etc. or other designated site.

Calculation module 406 periodically retrieves data from collector modules 160 such as counts from array 106, which are stored in data files 410. Calculation module 406 also maintains a master array which mirrors array 106, but includes a cumulative count of all buckets from a time period. Once a report is shipped to accounting, however, the master array can be reset to zero, and the accumulation of counts can be restarted for a next duration of time, such as a week, a month, a quarter, etc.

Calculation module 406 also compares the data in each bucket of the array to a threshold to determine how many times the customer's computer resource utilization exceeded the threshold. This is accomplished by sending the array data to the billing center where the threshold data is processed according to the terms of the customer's service contract. For example: if a customer has contracted for the use of 8 processors in a 16 processor system and utilization of the system exceeding 50 percent indicates the use of processors in excess of 8. The actual billing rate for utilization beyond the contracted base of 8 processors is negotiated by the vendor and customer when the service contract is created Once calculation module 406 computes the computer resource utilization over a specific threshold, report module 408 generates a usage report which indicates exactly how many resources were utilized the amount that exceeded the agreed threshold. It is possible to use information from the report for charging a customer for utilization of computer resources above an agreed quantity threshold quantity, or for other purposes such as analyzing, monitoring, and predicting computer system performance.

Redundant reporter modules may be linked together, with one reporter module designated as the primary reporter module for receiving information and data from one or more collector modules, and the other reporter module designated as a secondary reporter module that maintains a duplicate copy of information stored by the primary reporter module, in the event the primary reporter module fails. Typically, secondary reporter modules will ping the primary reporter module on a periodic basis, such as when requesting duplicate copies of data for backup, and will takeover the role of the primary reporter module, if the primary reporter module fails to respond in a prescribed period of time. A particular secondary reporter module will notify the one or more collector modules 160 to transfer data to it instead of the primary reporter module in such a scenario.

In another implementation, if multiple reporter modules are configured as part of usage metering system 102 to function in a primary module and a secondary standby mode relationship, and primary reporter module fails to respond to a collector module's request to push data to it, one of the secondary reporter modules will designate itself as the primary module and resume the process of receiving data from collector modules and data consolidation and monitoring. If eventually the reporter module, which failed again, becomes function, through restart or user intervention, the failed reporter module will designate itself as standby or secondary reporter module.

Methods of Operation

Methods for collecting computer resource utilization data from process utilization manager 126 may be described in the general context of computer-executable instructions. Generally, computer-executable instructions include routines, programs, objects, threads, components, data structures, etc. and the like that perform particular functions or implement particular abstract data types. The described methods may also be practiced in distributed computing environments where functions are performed by remote processing devices that are linked through a communications network. In a distributed computing environment, computer-executable instructions may be located in both local and remote computer storage media, including memory storage devices (computer-readable media).

Figure 5:
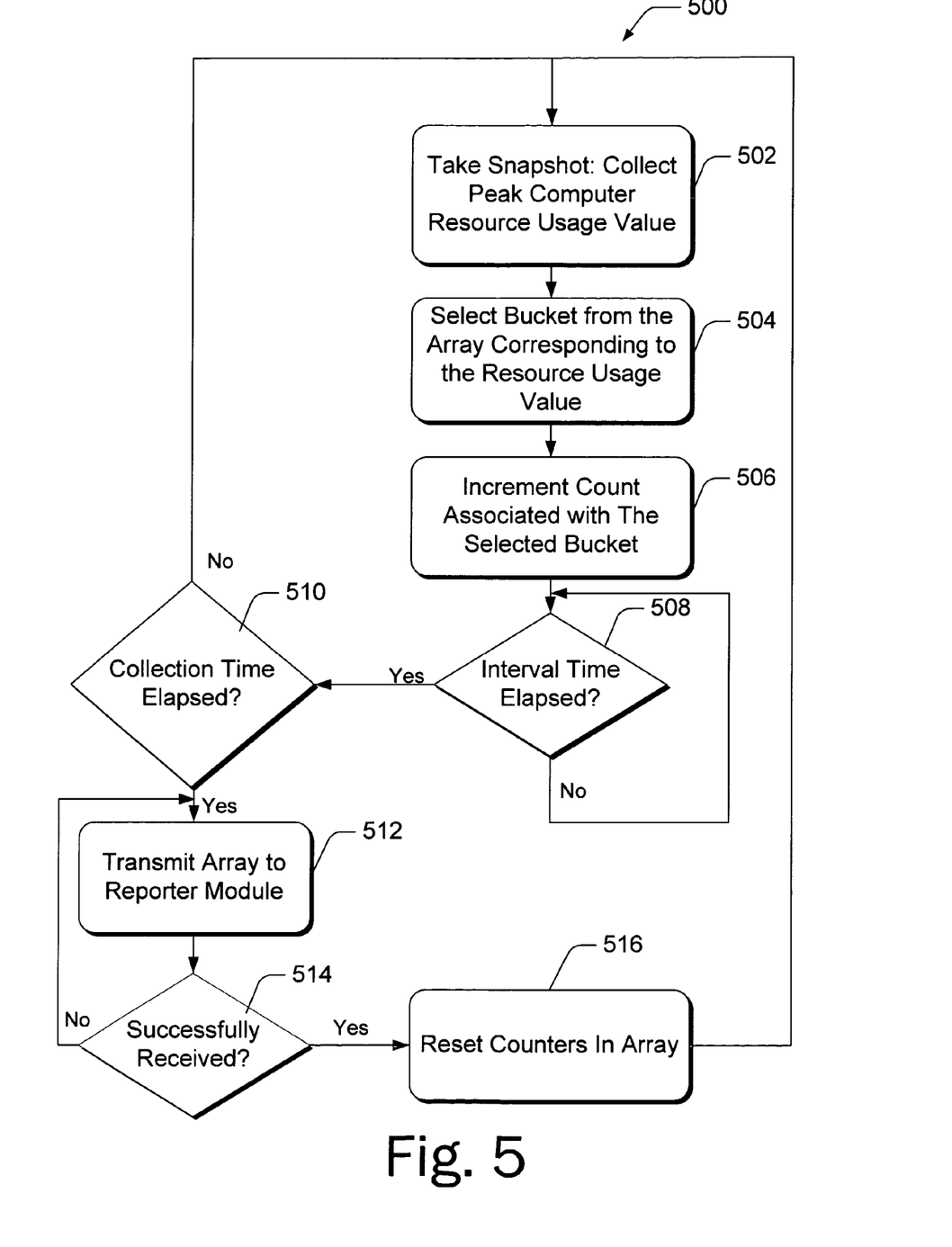
FIG. 5 is a flow diagram illustrating an exemplary method of operation associated with collecting computer resource utilization data.

FIG. 5 is a flow diagram illustrating an exemplary method 500 of operation associated with collecting computer resource utilization data. The order in which the method is described is not intended to be construed as a limitation, and any number of the described method blocks can be combined in any order to implement the method. Each of the operations and blocks may be optional and do not necessarily have to be implemented. Furthermore, the method can be implemented in any suitable hardware, software, firmware, or combination thereof. Exemplary method 500 includes blocks 502, 504, 506, 508, 510, 512, 514, and 516.

In block 502, a snapshot of the process utilization manager is taken providing a value indicative of peak amount of computer resource utilized at a particular time. For example, array manager 204 (FIG. 2) of collector module 160 (FIGS. 1 and 2) reads the value indicated process utilization manager 126 (FIG. 1).

In block 504, a bucket corresponding to the value is selected from an array. For example, array manager 204 selects a bucket 0 through 100 from array 106 corresponding to the value obtained from taking the snapshot.

In block 506, a counter associated with selected bucket is incremented. For example, array manager 204 increments the counter associated with the selected bucket by one.

In a decisional block 508, a determination is made whether an interval time between snapshots has elapsed. For example, a timer (not shown) within array manager 204 determines how long to wait between each successive snapshot. If enough time has not elapsed, then process 500 shall wait the prescribed period of time according to the No branch of decisional block 508. If enough time has elapsed, the process 500 proceeds to decisional block 510.

In decisional block 510, a determination is made whether a second and longer duration of time has elapsed, such as minutes, hours, weeks or days. If such second duration of time has not elapsed, then according the No branch of decisional block 510, process 500 proceeds back to block 502 and process 500 repeats itself for the next snapshot or iterations of snapshots. If the second duration of time has elapsed, then according the Yes branch of decisional block 510, process 500 process proceeds to block 512.

In block 512, the array or values associated with each counter of the array is forwarded to a reporter module. For example, communication module 202 (FIG. 2) transmits an array 206 (FIG. 2) to reporter module 136 (FIG. 1).

In a decisional block 514, a determination is made whether the array was successfully received by the reporter module. For example, unless an acknowledgement is received from a reporter module that it successfully received the data contained in the array maintained by the collector module, according the No branch of decisional block 514, the collector module will attempt to resend the message (block 512) after a prescribe period of time or take other corrective action such as notifying a secondary reporter module that it is having problems communicating with the a primary reporter module. If the array was successfully received process 500 proceeds to block 516.

In block 516, the counters comprising the array are reset to zero. For example, array manager 204 resets all the counters in array 206. Alternatively, it is noted that array manager could also start a new array or continue keep counting and let the reporter module worry about where the counts left off. Process 500 repeats itself for the next duration of time.

Figure 6:
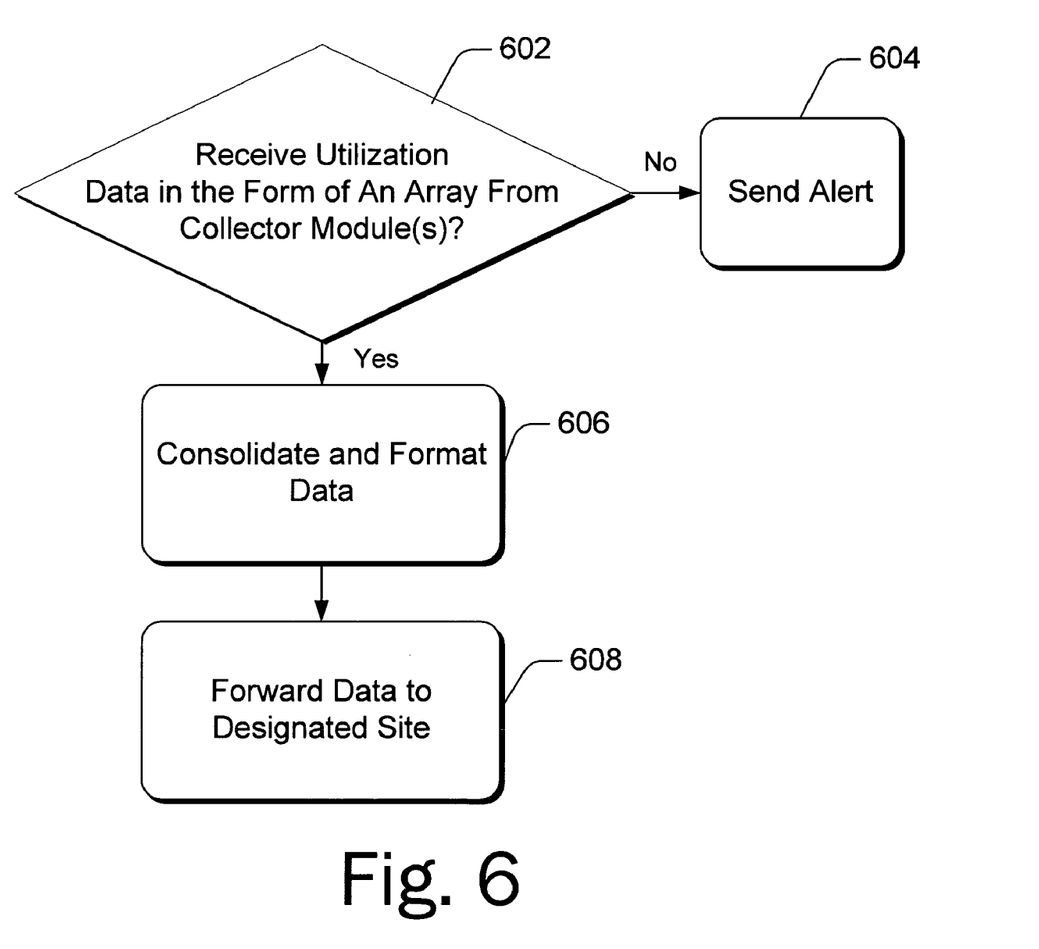
FIG. 6 is a flow diagram illustrating an exemplary method of operation associated with recording and reporting computer resource utilization data.

FIG. 6 is a flow diagram illustrating an exemplary method 600 of operation associated with recording and reporting computer resource utilization data. The order in which the method is described is not intended to be construed as a limitation, and any number of the described method blocks can be combined in any order to implement the method. Each of the operations and blocks may be optional and do not necessarily have to be implemented. Furthermore, the method can be implemented in any suitable hardware, software, firmware, or combination thereof. Exemplary method 600 includes blocks 602, 604, 606, and 608.

In a decisional block 602, a reporter module attempts to retrieve data from a collector module (in a pull strategy) or waits to receive data from a collector module (in push module). If in either case, the reporter module is unable to receive data after a prescribed period of time or number of attempts to communicate with the collector module, then according to the No branch of decisional block 602 process 600 proceeds to block 604 and an alert is send to a designated site, person or service center, that there is a problem with the health of an instance partition, computer system, and/or collector module. If according to the Yes branch of decisional block 602, the reporter module receives utilization data (typically in the form of an array), then process 600 proceeds to block 606.

In block 606, the data from the array is consolidated and formatted based on the data record format required by the billing center. At a minimum the data is formatted into a comma separated data file and a human readable text file. Additional data files are created using the data record templates of the target billing systems. These templates are provided to the reporter module at the time of software installation. All data files transmitted from the reporter are processed to generate an encrypted digital signature. This signature is used at the receiving billing center to ensure the integrity of the received files.

In block 608, a report is sent to a designated site, such as billing center 180 (FIG. 1) for analysis or generation of bill, in the event the customer utilized more computer resources than an agreed upon threshold level.

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A method, comprising:
   (a) collecting, by a first computer system, a peak value indicating a peak level of computer resource utilization in the computer system;
   (b) selecting a bucket from a first array of buckets corresponding to the collected peak value, wherein each bucket from the array contains a count value providing a recorded history of how many times a particular level of computer resource utilization was observed;
   (c) modifying the count value maintained in the selected bucket corresponding to the collected peak value;
   (d) repeating, iteratively, the operational acts described in paragraphs (a), (b), and (c) for a first period of time; and
   (e) generating a report based on the count values contained in the first array of buckets indicative of the levels of computer resource utilization realized during at least the first period of time and a threshold value such that the report indicates the number of times a particular computer resource utilization level was greater than the threshold value;
   wherein the count values in the first array of buckets and the number of times a particular computer resource utilization level was greater than the threshold value are used in generating a bill associated with the amount of computer resources utilized.

2. The method as recited in claim 1, further comprising transferring each count value maintained in the first array of buckets to a second computer system after a second period of time.

3. The method as recited in claim 1, further comprising transferring each count value maintained in the first array of buckets to a second array of buckets after a second period of time, each bucket containing a count value representing an accumulation of count values received from a corresponding bucket in the first array of buckets.

4. The method as recited in claim 1, further comprising forwarding the report to a billing center.

5. The method as recited in claim 1, wherein the iterative acts of collecting, selecting and modifying is performed by a collector module residing on the first computer system.

6. The method as recited in claim 1, wherein the act of generating a report is performed by a reporter module.

7. A method for metering computer resource utilization occurring on a computer system, comprising:
maintaining an array of buckets corresponding to different levels of computer peak resource utilization, each bucket having a counter indicating a quantity of instances a level of computer peak resource utilization was reached over a collection time;
collecting peak computer resource utilization data indicating an amount of a computer resource utilized during a particular interval of time of a plurality of interval of times within the collection time;
modifying the value of the counter in the bucket of the array of buckets corresponding to the level of computer peak resource utilization for the particular interval of time;
repeating the steps of collecting computer peak resource utilization data and modifying the value of the counter for each of the plurality of interval of times; and
reporting computer peak resource utilization over the collection time based on values of the counters in the array of buckets and a threshold value such that the reporting indicates the number of times a particular computer resource utilization level was greater than the threshold value;
wherein the count values in the array of buckets and the number of times a particular computer resource utilization level was greater than the threshold value are used in generating a bill associated with the amount of computer peak resources utilized.

8. The method as recited in claim 7, wherein the acts of collecting, maintaining, and modifying are performed by a collector module operating as software code executing on one or more processors.

9. The method as recited in claim 7, wherein the act of reporting the computer resource utilization is performed by a reporter module operating as software code executing on one or more processors.

10. A usage metering system, comprising:
a collector module, operating on a computer system, the collector module configured to take a snapshot of a process utilization manager of the computer system on a continuous basis over a prescribed period of time and record peak performance data in an array; wherein the array comprises a plurality of buckets, each bucket represents a particular incremental value of a computer resource utilization level, and each bucket has a counter with a count value indicating the number of times a particular computer resource utilization level was observed; and
a reporter module, operating on the computer system, the reporter module configured to use a threshold value to generate a report that indicates the number of times a particular computer resource utilization level was greater than the threshold value;
wherein the count values in the array and the number of times a particular computer resource utilization level was greater than the threshold value are used in generating a bill associated with the amount of computer resources utilized;
wherein each snapshot provides a value indicative of a peak amount of computer resource utilized at a particular time interval within the prescribed period of time, and
wherein each value of a snapshot is used by the collector module to select a bucket from the array corresponding to the value of the snapshot, and to modify the count value of the selected bucket each time a particular computer resource utilization level was observed that corresponds to the selected bucket.

11. The usage metering system as recited in claim 10, further comprising a reporter module configured to communicate with the collector module and to receive data from the collector module associated with the array.

12. The usage metering system as recited in claim 10, further comprising a reporter module configured to (i) communicate with the collector module (ii) receive data from the collector module associated with the array, and (iii) consolidate and format the data for eventual transmission to a designated system.

13. The usage metering system as recited in claim 10, further comprising a reporter module configured to attempt to communicate with the collector module, but if the reporter module is unable to receive data from the collector module after one of a prescribed period of time and number of attempts to communicate with the collector module, then the reporter sends an alert message to one of a designated site, person, and service center, indicating that there is a problem with the health of an instance partition, computer system, and/or the collector module.

14. The usage metering system as recited in claim 10, further comprising a first and second reporter module, the first reporter module configured to collect utilization data in the form of the array from collector module and report the utilization data to a designated entity, the second reporter module configured to collect to collect the utilization data in the form of the array from the collector module and report the utilization data to a designated entity in lieu of the first reporter module, if the first reporter module is unable to communicate with the collector module.

15. The usage metering system as recited in claim 10, wherein the collector module resides on the computer system.

16. The usage metering system as recited in claim 10, further comprising a reporter module configured to communicate with the collector module and to consolidate and format the data for eventual transmission to a designated system, wherein the reporter module resides on a supervision computer separate from the computer system.

* * * * *